United States Patent [19]

Sasaki et al.

[11] Patent Number: 4,908,402
[45] Date of Patent: Mar. 13, 1990

[54] REINFORCED RESIN COMPOSITION

[75] Inventors: Isao Sasaki; Kozi Nishida; Masaru Morimoto; Hisao Anzai; Hideaki Makino, all of Hiroshima, Japan

[73] Assignee: Mitsubishi Rayon Co., Ltd., Japan

[21] Appl. No.: 149,645

[22] Filed: Jan. 28, 1988

[51] Int. Cl.$^4$ .............................................. C08K 7/06
[52] U.S. Cl. ..................................... 524/495; 524/555
[58] Field of Search ............................. 524/495, 555; 525/328.2, 378, 379

[56] References Cited

U.S. PATENT DOCUMENTS 4,246,374 1/1984 Kopchik .............................. 525/329
4,412,687 11/1983 Andre ................................. 428/117

FOREIGN PATENT DOCUMENTS 0216505 4/1987 European Pat. Off. .
49-75681 7/1974 Japan .
51-37147 3/1976 Japan .
1559132 1/1980 United Kingdom .

OTHER PUBLICATIONS

Titow et al.; Reinforced Thermoplastics; John Wiley & Sons; 1975; pp. 108–111.

Primary Examiner—Lewis T. Jacobs
Attorney, Agent, or Firm—Brumbaugh, Graves, Donohue & Raymond

[57] ABSTRACT

A reinforced resin composition which comprises 50–95% by weight of polyglutarimide resin and 5–50% by weight of carbon fibers.

The polyglutarimide resin is one containing imide units of 2% by weight or more, represented by the formula,

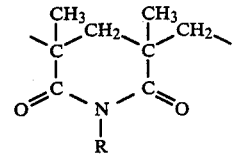

wherein R stands for hydrogen atom or an aliphatic, aromatic or alicyclic hydrocarbon group having 1 to 20 carbon atom(s).

8 Claims, No Drawings

REINFORCED RESIN COMPOSITION

BACKGROUND OF THE INVENTION

This invention relates to a polyglutarimide molding material reinforced by carbon fibers.

Polyglutarimide which is a non-crystalline resin with high transparency is used as molding materials and recently, being used as a core material for plastic optical fibers. The heat resistance of polyglutarimide is remarkably improved due to its structure of glutarimide ring so that the heat distortion temperature exceeds 150° C. in case of using polyglutarimide as a molding material. However, such a polyglutarimide, originally, falls under the category of acrylic resins and therefore, does not have satisfactory properties in respect of tensile strength, tensile modulus, flexural strength, flexural modulus and impact strength.

As for carbon fiber reinforced plastics, for example, a carbon fiber reinforced polyester resin, the shrinkage in volume is caused by the plastic deformation and crystallization when cooled after heat molding and therefore, the resulting molded product has a remarkable distortion so that its commercial value is extremely reduced.

Also, in case of a carbon fiber reinforced polyamide resin, the crystallization velocity is larger than the abovementioned polyester resin so that the distortion during molding further increases. Under the existing circumstances, carbon fiber reinforced materials of crystalline resins are almost reduced unavoidably in the commercial value due to the distortion during molding.

SUMMARY OF THE INVENTION

An object of this invention is to provide a carbon fiber reinforced molding material of a thermoplastic resin with good heat resistance, which is a non-crystalline resin having no distortion during molding.

In accordance with this invention, there is provided a reinforced resin composition which comprises 50–95% by weight of polyglutarimide resin and 5–50% by weight of carbon fibers.

The reinforced resin composition of this invention has quite different properties from carbon fiber reinforced molding materials using a conventional thermoplastic resin.

The carbon fiber reinforced resin composition of this invention is improved in the mechanical properties and heat resistance like a glass fiber reinforced molding material and additionally, is superior in the wear resistance, thermal conductivity and fatique resistance due to the carbon fibers compared with glass fibers so that new uses are expected.

Although carbon fibers used are not particularly limited, there may be used, for example, carbon fibers of PAN type, carbon fibers of pitch type and carbon fibers of cellulose type. These carbon fibers may optionally be subject to various surface treatments.

Carbon fibers having a fiber length of 0.05 to 10 mm are preferred in view of physical properties. When the fiber length exceeds 10 mm, the fibers become cottony and thus, the workability for mixing fibers with a resin is reduced so that incorporating a large amount of fibers becomes difficult. Taking the productivity into consideration, a fiber length of 0.1 to 7 mm is preferable.

The amount of carbon fibers incorporated in the resin composition is preferably between 5% by weight and 50% by weight. If the amount exceeds 50% by weight, the flow processability or molding processability is reduced. On the other hand, if the amount is less than 5% by weight, the reinforcing effect of carbon fibers is low.

The polyglutarimide resin used in the present invention may be one containing imide units of 2% by weight or more, represented by the formula (1),

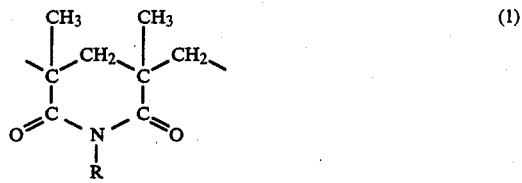

wherein R stands for hydrogen atom or an aliphatic, aromatic or alicyclic hydrocarbon group having 1 to 20 carbon atom(s).

As for a process for the preparation of the above polyglutarimide, for example, a methacrylate resin is reacted with at least one of compounds represented by the formula (2) (hereinafter referred to as imidizing agent), $$R-NH_2 \qquad (2)$$

wherein R is as defined above, in a solvent in the presence of an inert gas at temperatures of 100° to 350° C. and then, a volatile substance is removed from the resulting reaction products to obtain polyglutarimides comprising the imide units represented by the formula (1).

Herein, the methacrylate resin means a homopolymer of methyl methacrylate having an inherent viscosity of 0.01 to 3.0 and copolymers of 25% by weight or more of methyl methacrylate and 75% by weight or less of monomers copolymerizable with methyl methacrylate.

The inherent viscosity of the methacrylate resin was determined according to the following method.

By using a Deereax Bischoff viscometer, the flow time (ts) of a dimethylformamide solution containing 0.5% by weight of a sample polymer and the flow time (to) of dimethylformamide were measured at 25±0.1° C. The relative viscosity η rel of the polymer was determined from the value of ts/to, and the inherent viscosity was calculated according to the following equation: :

wherein C represents the amount (grams) of the polymer in 100 ml of the solvent.

Examples of the copolymerizable monomers include methacrylic acid esters (excluding methyl methacrylate), acrylic acid esters, methacrylic acid, acrylic acid, styrene and substituted styrenes and the like.

The solvents used in the above reaction are not particularly limited, provided that they do not hinder the imidization reaction of methacrylate resin and they do not affect segments of methyl methacrylate or (meth)acrylic acid ester and side chains of other monomers in the case of partial imidization. Solvents such as methanol, benzene and toluene are preferred in view of this meaning. Also, methanol may be used alone or in the form of mixture with benzene or toluene.

As for the imidizing agent of the formula (2), there may be mentioned, for example, ammonia, a primary amine such as methylamine, ethylamine and propylamine; a compound capable of forming a primary amine by heat, such as 1,3-dimethylurea, 1,3-diethylurea and 1,3-dipropylurea; urea capable of forming ammonia; an aromatic amine such as aniline, toluidine and trichloroaniline; an alicyclic amine such as cyclohexylamine and bornylamine. Ammonia and methylamine are preferred in view of heat resistance.

The content of imide units based on the polyglutarimide resin is 2% by weight or more as mentioned hereinbefore. For attaining good heat resistance the content of imide units of 10% by weight or more is preferred and in some cases, 30% by weight or more is preferred. Particularly, in case of using methylamine as the imidizing agent, its content is preferably 50% by weight or more.

When a plastic curve of the molding material of this invention is measured by means of a flow tester, the curve suddenly rises when exceeding the flow-initiating temperature and is very similar to the curve of polyglutarimide itself.

In the molding material of this invention, the hindered phenomenon by the carbon fiber is not observed and thus, it can be easily molded by injection molding and extrusion molding.

For example, in the injection molding, the temperature range of 230° to 280° C. may be sufficient for temperatures at the intermediate section of a cylinder and its tip like the case of polyglutarimide itself.

The molding material of this invention may contain a normally used substance for extending or modifying in such an amount as not affecting adversely polyglutarimide.

This invention will be illustrated by the following examples in which part and percent are all by weight.
Preparation of methacrylimide-containing polymers:
[A-1 through A-4]

A mixture of 100 parts of a sufficiently dried methyl methacrylate polymer having an inherent viscosity of 0.51 (Acrypet ® VH, the trademark, supplied by Mitsubishi Rayon Co., Ltd.), 90 parts of toluene and 10 parts of methanol was fed into a 10 l reactor provided with a paddle spiral stirrer, a pressure gauge, a sample feeding vessel and a jacket heater, which was sufficiently replaced by nitrogen and heated to dissolve the polymer under stirring. Next, a solution of 248 parts (0.8 molar ratio) of methylamine in methanol was added from the sample feeding vessel and heated under stirring at 230° C.

Reaction was effected at the inner pressure of 55 kg/cm$^3$-gauge pressure for 3 hours. After reaction a polyglutarimide solution was taken out and dried in a vacuum dryer at 100° C. to remove the solvent and then, a porous polymer was obtained.

When an infrared absorption spectrum of the polymer obtained was measured, absorptions peculiar to methacrylimide were observed at wave-numbers of 1720 cm$^{-1}$, 1663 cm$^{-1}$ and 750 cm$^{-1}$. This shows that the polymer obtained is polyglutarimide.
Content of imide units*: 100%
Heat distortion temperature: 182° C.
* Measured by proton NMR, JNM-FX-100(JEOL) spectrometer 100 MHz.

Similarly, various polyglutarimides were obtained varying the content of imide units and heat distortion temperature as set forth in Table 1.

TABLE 1

|     | Polyglutarimides | |
| --- | --- | --- |
|     | Content of imide units % | Heat distortion temperature °C. |
| A-1 | 100 | 182 |
| A-2 | 70  | 159 |
| A-3 | 50  | 150 |
| A-4 | 30  | 132 |

EXAMPLE 1 and COMPARATIVE EXAMPLE 1

Eighty parts of polyglutarimide of the above A-2 and 20 parts of carbon fibers having a fiber length of 6 mm were fed to a V type blender and mixed for five minutes. The resulting mixture was formed to pellets by means of a 40 mm$\phi$ vent type extruder at a cylinder temperature of 200° to 260° C. to obtain a carbon fiber reinforced resin. Using a 36 mm$\phi$ screw type injection molding machine of about 5 oz in capacity, the reinforced resin was injection molded at a cylinder temperature of 260° C., mold temperature of 90° C. and molding cycle of 60 seconds.

Plates of 110 mm ×110 mm ×3 mm (thickness), dumbbell specimens of 3.2 mm thickness for tensile test and specimens of 6.4 mm thickness for a notched impact strength and heat distortion temperature were prepared. These specimens have little sink mark, warpage and distortion and also, have a glossy, black and good appearance.

In Table 2, tensile strength at break and tensile elongation at break were measured in accordance with ASTM D-648, flexural strength and flexural modulus with ASTM D-790, Izod impact strength with ASTM D-256 and heat distortion temperature with ASTM D-648.

For comparison, Comparative Example 1 containing no carbon fibers is set forth in Table 2.

TABLE 2

|  | Comparative Example 1 | Example 1 |
| --- | --- | --- |
| Appearance | Colorless, transparent | Black |
| Tensile strength at break | 850 kg/cm$^2$ | 1,250 kg/cm$^2$ |
| Tensile elongation at break | 5% | 2.5% |
| Flexural strength | 1,400 kg/cm$^2$ | 1,650 kg/cm$^2$ |
| Flexural modulus | 41,500 kg/cm$^2$ | 55,500 kg/cm$^2$ |
| Impact strength (notched, ¼ in. thickness) | 1.5 kg · cm/cm | 5.0 kg · cm/cm |
| Distortion during molding* | 0.1 × 10$^{-3}$ | 0.1 × 10$^{-3}$ |
| Heat distortion temp. | 159° C. | 165° C. |

*The distortion is measured as follows:

A plate of 110 mm ×110 mm ×3 mm (thickness) which has been warped during molding is placed on a level surface and the height (h) of an intersecting point of two diagonal lines on the warped surface of the plate from the level surface and the length (L) of the diagonal line are measured. The distortion is represented by a ratio of h to L/2.

Examples 2 through 4 and Comparative Examples 2 through 4

The procedure of Example 1 was repeated using polyglutarimides of the above A-1, A-3 and A-4. The results obtained are set forth in Table 3. For compari-

TABLE 3

| | Comp. Ex. 2 | Example 2 | Comp. Ex. 3 | Example 3 | Comp. Ex. 4 | Example 4 |
|---|---|---|---|---|---|---|
| Polyglutarimide | A-1 | A-1 | A-3 | A-3 | A-4 | A-4 |
| Carbon fiber content, % | — | 20% | — | 20% | — | 20% |
| Fiber length of carbon fibers, mm | — | 0.3 | — | 0.3 | — | 0.3 |
| Appearance | Colorless, transparent | Black | Colorless, transparent | Black | Colorless, transparent | Black |
| Tensile strength at break, kg/cm$^2$ | 950 | 1,350 | 840 | 1,200 | 830 | 1,150 |
| Tensile elongation at break, % | 4 | 2.0 | 6 | 3 | 7.0 | 3.0 |
| Flexural modulus, kg/cm$^2$ | 53,300 | 63,800 | 40,000 | 55,500 | 38,000 | 45,000 |
| Impact strength, (notched, ¼ in. thickness) kg·cm/cm | 2 | 4.0 | 1.5 | 5.0 | 1.4 | 5.5 |
| Distortion during molding | $0.1 \times 10^{-3}$ | $0.1 \times 10^{-3}$ | $0.1 \times 10^{-3}$ | $0.1 \times 10^{-3}$ | $0.1 \times 10^{-3}$ | $0.1 \times 10^{-3}$ |
| Heat distortion temp., °C. | 182 | 245 | 150 | 165 | 132 | 152 |

What is claimed is:

1. A reinforced resin composition for use in forming molded and extruded products which comprises 50-95% by weight of polyglutarimide resin and 5-50% by weight of carbon fibers.

2. A reinforced resin composition of claim 1 wherein said polyglutarimide resin is one containing imide units of 2% by weight or more, represented by the formula (1),

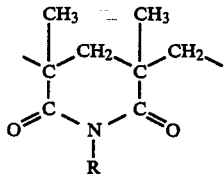

wherein R stands for hydrogen atom or an aliphatic, aromatic or alicyclic hydrocarbon group having 1 to 20 carbon atom(s).

3. A reinforced resin composition of claim 1 wherein said carbon fibers have a fiber length of 0.05 to 10 mm.

4. A reinforced resin composition of claim 2 wherein said polyglutarimide resin is one containing the imide units of the formula (1) of 10% by weight or more.

5. An injection molded article formed from a feedstock comprising 50-95% by weight of a polyglutarimide resin and 5-50% by weight of carbon fibers.

6. An injection molded article according to claim 5, wherein said polyglutarimide resin is one containing imide units of 2% by weight or more, represented by the formula (I),

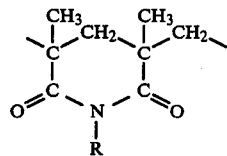

wherein R stands for hydrogen atom or an aliphatic, aromatic or alicyclic hydrocarbon group having 1 to 20 carbon atom(s).

7. An injection molded article according to claim 5, wherein said carbon fibers have a fiber length of 0.05 to 10 mm.

8. An injection molded article according to claim 7, wherein said polyglutarimide resin is one containing the imide units of the formula (1) of 10% by weight or more.

* * * * *